Sept. 13, 1938.　　　　J. D. FERRY　　　　2,130,082
FOOD IMPELLING MECHANISM
Filed Dec. 10, 1936
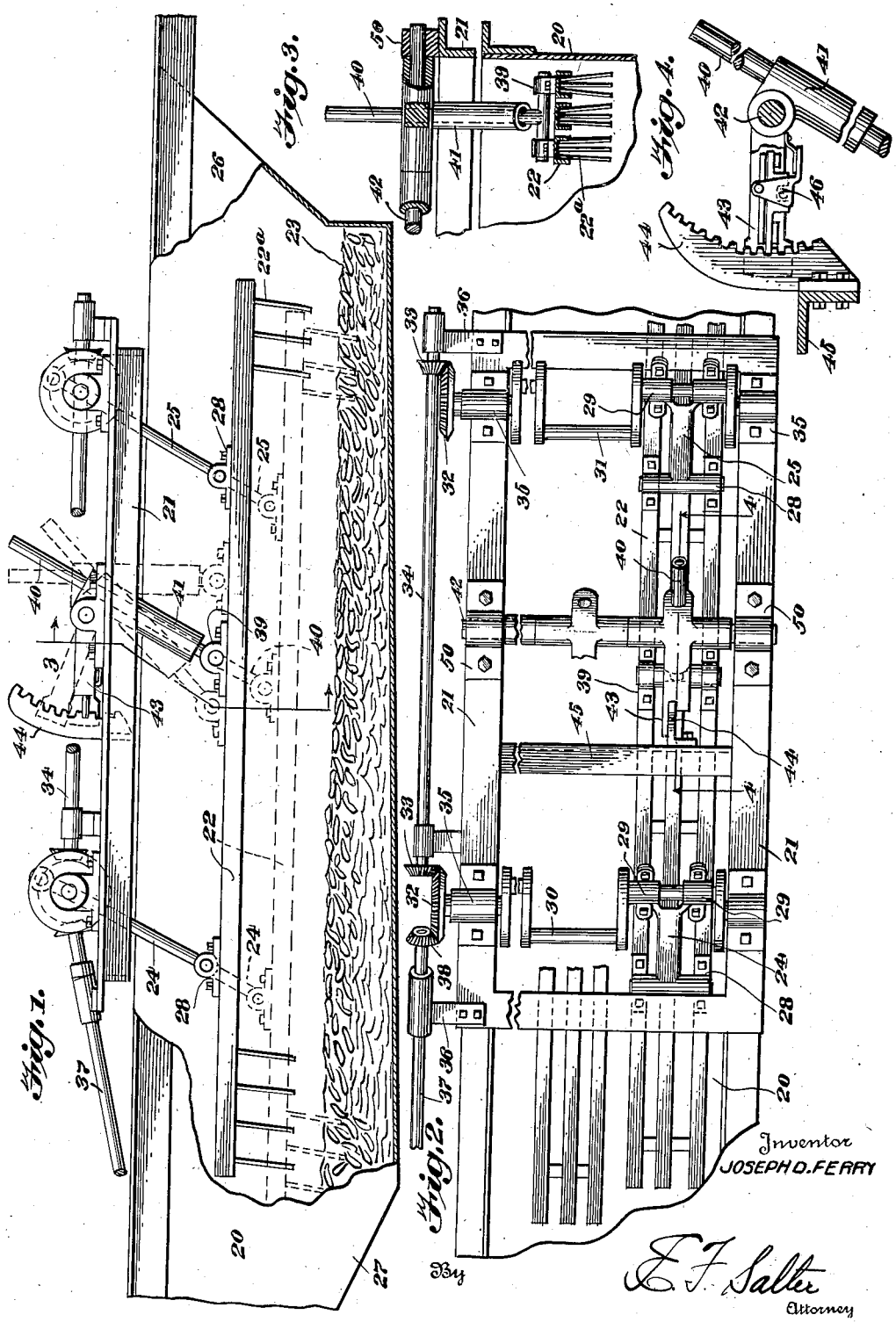
Inventor
JOSEPH D. FERRY
By E. F. Salter
Attorney Patented Sept. 13, 1938

2,130,082

UNITED STATES PATENT OFFICE 2,130,082

FOOD IMPELLING MECHANISM

Joseph D. Ferry, Harrisburg, Pa.

Application December 10, 1936, Serial No. 115,229

21 Claims. (Cl. 53—7)

My present invention relates to apparatus for cooking vegetables and similar articles, more particularly potato chips, as disclosed and claimed in my Patent 2,056,845 dated October 6, 1936, according to which impellers are utilized for immersing the chips and at the same time advancing the same during the cooking operation in a regular uniform manner, in the cooking oil to the discharge end of the cooking kettle.

My above patent discloses an apparatus in which the impellers with their depending tines are operated so that they travel in an elliptical path, during each downstroke of which the tines engage, immerse and slightly advance the chips so that the duration of immersion always bears a definite relation to the degree of advancement of the chips in the cooking oil.

It is the primary object of my present improvements to provide for a somewhat different movement of the impellers by a means which will permit of ready adjustment to increase or decrease the number of immersions of the chips in respect to the feeding movement thereof so as to thus increase or decrease the total duration of immersion as a control of the cooking operation to accord with the particular characteristics of potatoes as far as the cooking necessities are concerned.

In other words, my aim at present is to provide an impeller mechanism having readily adjustable means for varying the movement of the impellers in the cooking oil to control the feed of the chips and the number and extent of immersions thereof in the cooking oil, thereby compensating for either slow or quick cooking potatoes.

In the accompanying drawing, which forms a part of this specification and wherein like characters of reference denote like parts throughout, Figure 1 is a side view, partly broken away and in section of a cooking kettle, showing the practical application of my improved impeller mechanism, Figure 2 is a top plan view thereof, Figure 3 is a detail partial vertical transverse sectional view taken on line 3—3 of Figure 1, and Figure 4 is a detail partial vertical longitudinal section taken on line 4—4 of Figure 2.

Referring now to these figures, the numeral 20 designates a cooking kettle adapted to be partially filled with a cooking liquid 23 through which the chips are moved from the right to the left as viewed in Figure 1. The kettle is preferably heated in the manner disclosed in my aforementioned patent to produce a high temperature at the inlet end with a gradually diminishing temperature toward the outlet end of the kettle, this differential in temperature aiding in the advancement of the chips toward the outlet end of the kettle.

An impeller frame 21 is supported immediately above the kettle in any suitable manner and has suspended therefrom impellers which are disposed in horizontal positions lengthwise within the cooking oil 23.

As shown particularly in Figure 2, the impellers comprise a plurality of connected longitudinally extending rake bars 22 and depending tines 22a which are arranged in spaced relation throughout the length of the bars 22. Each impeller is pivotally connected to the lower ends of forward and rear connecting rods 24 and 25, considered in respect to the movement of the chips from the receiving end 26 of the kettle to its discharge end, and these connections are affected by bearing members or brackets 28 bolted or otherwise securely fastened to the rake bars 22.

The upper ends of the connecting rods 24 and 25 have split bearing connections 29 with the cranks of forward and rear crank shafts 30 and 31 and these shafts have at one end bevel gears 32 in engagement with bevel gears 33 of a longitudinally extending connecting shaft 34. The crank shafts 30 and 31 are mounted on the frame 21 in bearings 35 and this frame has laterally extending bearing members 36 for the connecting shaft 34 and a drive shaft 37. Drive shaft 37 may extend from any suitable source of power (not shown) and has a bevel gear 38 engaging the bevel gear 32 of the forward crank shaft.

Between the front and rear connecting rods 24 and 25, each series of bars 22 has fixed bearing brackets 39 to pivotally connect and support an upstanding control rod 40 projecting slidably through a controlling sleeve 41 which forms the depending part of a bell-crank, having its fulcrum on a transverse shaft 42 supported in bearing brackets 50 on the frame 21.

The bell-crank also includes a forwardly projecting substantially horizontal arm 43, the free end of which slidably engages a notched segment 44 stationarily mounted on a cross bar 45 forming a rigid part of the frame 21. The arm 43 also has a latch mechanism seen at 46 which may be selectively engaged with the notched edge of segment 44 along its concave surface curved on an arc having for its center the axis of shaft 42. Thus, the position of arm 43 may be definitely fixed to similarly fix the forward and downward inclination of the controlling sleeve 41, or to hold the sleeve 41 in a vertical position.

The rigidly supported guide and controlling sleeve 41 obviously controls movement of the rake bars 22. If the sleeve 41 is disposed in a position or plane inclined to a vertical plane, the rake bars will be reciprocated in a plane corresponding to the inclination of the sleeve 41 and such reciprocation will be accomplished by an endwise or longitudinal shifting of the rake bars, as shown in dotted lines in Figure 1. Thus, the plane of reciprocatioin of the rake bars is determined by the position of the control sleeve 41.

If the control sleeve is arranged in a strictly vertical position, the downward movement of the rake bars will cause the tines 22a to dip into the liquid and bring about a relatively deep immersion of the chips without causing a material advance thereof.

On the other hand, if the control sleeve 41 occupies a position inclined to a vertical plane, each downward stroke of the rake bars will cause the tines 22a to dip into the cooking oil 23 and immerse the chips therein and at the same time impart thereto a forward movement in the direction of the discharge end of the kettle, which movement may be increased or decreased by adjusting the inclination of sleeve 21. As might otherwise be stated, the inclination of the control sleeve 41 effects a compound movement of the rake bars. That is to say, the reciprocation of the rake bars in a plane inclined to a vertical plane also brings about an endwise movement of the bars so that the tines immerse and impart a forward movement to the chips.

It is plain that the more nearly movements of bars 22 approach the vertical, the less the tines 22a will effect feeding movement of the chips. Hence, the movement of the chips along the cooker will be correspondingly slower and they will thus be subjected to a greater number of immersions and consequently a longer and more effective cooking operation without varying the cooking heat or the speed of movement of the rake bars.

It is to be understood that a separate control sleeve 41 and associated mechanism will be provided for each impeller so that each impeller is adjustable independently of the other impellers and the adjustment can be made simply and rapidly to obtain the desired movement of the impellers while the machine is in operation or between periods of operations.

Having thus described the invention, what is claimed is:

1. In an apparatus of the character described, a container for the reception of a cooking liquid and adapted to have foodstuffs moved therethough, an impeller in said container above the level of the liquid therein, said impeller having a depending member, and means to reciprocate said impeller in a plane inclined to a vertical plane to cause said depending member to intermittently dip into the cooking liquid for engaging, immersing and advancing the foodstuffs.

2. In an apparatus of the character described, a container for the reception of a cooking liquid and adapted to have foodstuffs moved therethrough, an impeller in said container above the level of the liquid therein, said impeller having a depending member, means to reciprocate said impeller in a plane inclined to a vertical plane to cause said depending member to intermittently dip into the cooking liquid for engaging, immersing and advancing the foodstuffs, and means to vary the angle of the plane of reciprocation of said impeller with respect to a vertical plane.

3. In an apparatus of the character described, a container for the reception of a cooking liquid and adapted to have foodstuffs move therethrough, an impeller in said container above the level of the liquid therein, and means for imparting up and down movement to said impeller in an inclined straight line to cause the same to intermittently dip into the cooking liquid to engage and immerse the foodstuffs.

4. In an apparatus of the character described, a container for the reception of a cooking liquid and adapted to have foodstuffs moved therethrough, an impeller in said container above the level of the liquid therein, and means to reciprocate said impeller in a straight line through an inclined vertical plane to cause the impeller to intermittently dip into the cooking liquid to engage and immerse the foodstuffs.

5. In an apparatus of the character described, a container for the reception of a cooking liquid, a supporting frame arranged in proximity to the top of the container, a rotating eccentric carried by said frame, an impeller in said container, a connecting rod pivotally connected to the eccentric and impeller, and guide means associated with said impeller and frame for translating the circular motion of said eccentric into a reciprocatory motion in a plane disposed at an angle to a vertical plane.

6. In an apparatus of the character described, a container for the reception of a cooking liquid, a supporting frame arranged in proximity to the top of the container, a rotating eccentric carried by said frame, an impeller in said container, a connecting rod pivotally connected to the eccentric and impeller, guide means associated with said impeller and frame for translating the circular motion of said eccentric into a reciprocatory motion in a plane disposed at an angle to a vertical plane, and means to vary the angle of the plane of reciprocation of said impeller with respect to a vertical plane.

7. In an apparatus of the character described, a container for the reception of a cooking liquid, a supporting frame arranged in proximity to the top of the container, a rotating eccentric carried by said frame, an impeller in said container, a connecting rod pivotally connected to the eccentric and impeller, and guide means operatively engaging said impeller for translating the circular motion of said eccentric into a reciprocatory motion in a vertical plane or in a plane disposed at an angle to a vertical plane.

8. An impeller mechanism for cooking apparatus, including horizontally disposed rake bars having depending tines, and means to impart up and down movements to said bars in a straight line.

9. An impeller mechanism for cooking apparatus, including a series of horizontally disposed rake bars having depending tines, means to impart up and down movements to said bars, and means to constrain such movements to a straight line inclined to a vertical plane.

10. An impeller mechanism for cooking apparatus, including a series of horizontally disposed rake bars, means to reciprocate said rake bars, means to constrain the reciprocatory motion imparted to said bars to a straight line disposed at an angle to a horizontal plane, and means to adjust said last-named means to vary the angle of reciprocation of said rake bars with respect to a horizontal plane.

11. An impeller mechanism for cooking apparatus, including a frame, rotatable crank shafts carried by the frame, a series of rake bars having downwardly projecting tines, connecting rods extending downwardly from the cranks of said shafts and pivotally connected to said rake bars for movably suspending the latter below the frame, and means associated with said frame and said rake bars for guiding the rake bars in their up and down movements to control lengthwise shifting thereof during said movements.

12. An impeller mechanism for cooking apparatus, including a frame, rotatable shafts carried by said frame and having cranks, a series of rake bars having depending tines, connecting rods between the rake bars and the cranks of said shafts for suspending and moving the rake bars below the frame, a guide member secured in an inclined position on the frame, and a guide rod pivotally connected to the rake bars and slidably engaged with said guide member for controlling lengthwise shifting of the bars during their up and down movements.

13. An impeller mechanism for cooking apparatus, including a support, rotatable crank shafts carried by support, a series of rake bars having depending tines, connecting rods suspending and actuating said rake bars from the shaft cranks, a bell-crank fulcrumed on the support and having an upright arm and a generally horizontal arm, a notched segment rigid with the support, a latch mechanism carried by said latter arm and adjustably in engagement with the said segment, and a rod extending upwardly from the rake bars and in slidable connection with the said upright arm of the bell-crank.

14. An impeller mechanism for cooking apparatus, including a support, rotatable crank shafts journalled in said support, a series of rake bars having depending tines, connecting rods suspending and actuating said rake bars from the shaft cranks, a bell-crank fulcrumed on the support, one arm of which is in the nature of an uprightly disposed tubular guide, an adjustable connection between the other arm of the bell-crank and the support for holding the said tubular arm in selected positions, and a rod pivoted to and projecting upwardly from the said rake bars and extending in slidable relation through the tubular guide arm of the bell-crank.

15. In an apparatus of the character described, a container for the reception of a cooking liquid, a food impeller therein, and means to reciprocate said impeller in a plane inclined to a vertical plane to cause said impeller to engage intermittently with food and immerse and advance it through the cooking liquid.

16. In an apparatus of the character described, a container for the reception of a cooking liquid, an impeller in the container, a rotating eccentric, a connecting rod pivotally connected to the eccentric and impeller, and guide means for translating the circular motion of said eccentric into a reciprocatory motion in a plane disposed at an angle to a vertical plane.

17. In an apparatus of the character described, a container for the reception of a cooking liquid, an impeller in the container, a rotating eccentric, a connecting rod pivotally connected to the eccentric and impeller, means for translating the circular motion of said eccentric into a reciprocatory motion in a plane disposed at an angle to a vertical plane, and means to vary the angle of the plane of reciprocation of the impeller with respect to a vertical plane.

18. In a food cooking apparatus, a container, impeller mechanism therein including a rotatable driving element, a series of rake bars having depending tines, means operatively connecting said driving element and the rake bars, and means for guiding said rake bars to control lengthwise shifting thereof during operation.

19. In a food cooking apparatus, a container for cooking liquid, a driving element, an impeller in the container, means pivotally suspending the impeller from said driving element, and motion translating means associated with the impeller for confining the movements of the impeller to reciprocation in a straight line inclined to a vertical plane.

20. In a food cooking apparatus, food impeller means, means effecting reciprocation of said impeller means in a straight line inclined to a vertical plane, and means adjustable to vary the line of reciprocation of said impeller.

21. In a food cooking apparatus, food impeller means, and means effecting reciprocation of said impeller means in a straight line inclined to a vertical plane.

JOSEPH D. FERRY.